(12) United States Patent
Schweiss

(10) Patent No.: US 10,431,837 B2
(45) Date of Patent: Oct. 1, 2019

(54) MEMBRANE ELECTRODE ASSEMBLY

(71) Applicant: SGL CARBON SE, Wiesbaden (DE)

(72) Inventor: Rüdiger-Bernd Schweiss, Meitingen (DE)

(73) Assignee: SGL CARBON SE, Wiesbaden (DE)

(*) Notice: Subject to any disclaimer, the term of this patent is extended or adjusted under 35 U.S.C. 154(b) by 5 days.

(21) Appl. No.: 15/324,876

(22) PCT Filed: Jul. 2, 2015

(86) PCT No.: PCT/EP2015/065061
§ 371 (c)(1),
(2) Date: Jan. 9, 2017

(87) PCT Pub. No.: WO2016/005257
PCT Pub. Date: Jan. 14, 2016

(65) Prior Publication Data
US 2017/0222241 A1    Aug. 3, 2017

(30) Foreign Application Priority Data
Jul. 11, 2014    (DE) .................. 10 2014 213 555

(51) Int. Cl.
*H01M 8/1004* (2016.01)
*H01M 8/0234* (2016.01)
(Continued)

(52) U.S. Cl.
CPC ....... *H01M 8/1004* (2013.01); *H01M 4/8807* (2013.01); *H01M 4/92* (2013.01);
(Continued)

(58) Field of Classification Search
None
See application file for complete search history.

(56) References Cited

U.S. PATENT DOCUMENTS

2003/0109189 A1*  6/2003  Jorder .................. D04H 1/4242
                                                         442/327
2008/0063924 A1*  3/2008  O'Hara .................. H01B 1/122
                                                         429/492
(Continued)

FOREIGN PATENT DOCUMENTS

CA      2 866 706 A1    9/2013
DE   102011083118 A1    3/2013
(Continued)

OTHER PUBLICATIONS

Machine translation of JP2009-170204A, printed Apr. 29, 2018 (Year: 2018).*

(Continued)

*Primary Examiner* — Maria Laios
(74) *Attorney, Agent, or Firm* — Maier & Maier, PLLC

(57) ABSTRACT

Membrane electrode assembly for PEM fuel cells, including a proton exchange membrane, two catalyst layers (anode and cathode catalyst layer), and two gas diffusion layers, the anodic one of which is based on a carbon fiber paper and is provided with a microporous layer including graphite, carbon nanotubes or carbon nanofibers, and PTFE, whereas the cathodic gas diffusion layer is based on a carbon fiber structure and is provided with a microporous layer based on carbon black, carbon nanotubes and/or carbon nanofibers, and PTFE.

6 Claims, 2 Drawing Sheets

Figure 1:
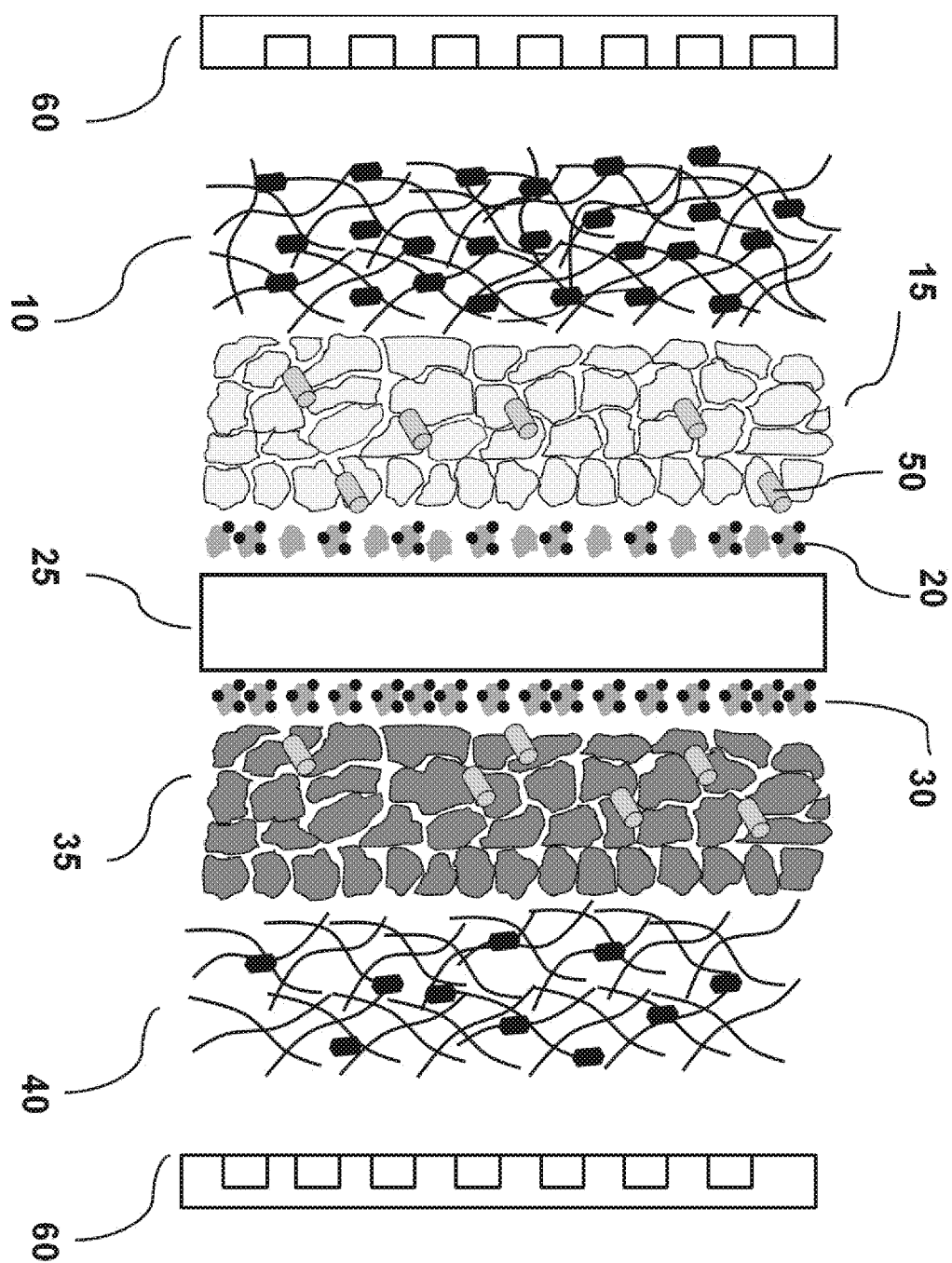

(51) Int. Cl.
*H01M 8/0245* (2016.01)
*H01M 4/88* (2006.01)
*H01M 4/92* (2006.01)
*H01M 8/0243* (2016.01)
*H01M 8/1018* (2016.01)

(52) U.S. Cl.
CPC ....... *H01M 8/0234* (2013.01); *H01M 8/0245* (2013.01); *H01M 8/0243* (2013.01); *H01M 2008/1095* (2013.01)

(56) References Cited

U.S. PATENT DOCUMENTS

| | | | |
|---|---|---|---|
| 2008/0292927 A1* | 11/2008 | An | H01M 8/0202 429/431 |
| 2009/0181235 A1* | 7/2009 | Owejan | H01M 4/8814 428/315.9 |
| 2009/0197137 A1 | 8/2009 | Lee et al. | |
| 2010/0028750 A1 | 2/2010 | Ji et al. | |

FOREIGN PATENT DOCUMENTS

| | | |
|---|---|---|
| EP | 1721355 B1 | 7/2010 |
| EP | 2343762 A1 | 7/2011 |
| EP | 2 722 917 A1 | 4/2014 |
| EP | 3 113 265 A1 | 1/2017 |
| JP | 2006-523936 A | 10/2006 |
| JP | 2007-073415 A | 3/2007 |
| JP | 2009170204 | * 7/2009 .............. H01M 4/86 |
| JP | 2009170204 A | 7/2009 |
| JP | 2010-102950 A | 5/2010 |
| JP | 2010102950 A | 5/2010 |
| WO | 2004/093231 A2 | 10/2004 |
| WO | 02/35620 A2 | 5/2005 |

OTHER PUBLICATIONS

International Search Report dated Aug. 13, 2015 in corresponding application No. PCT/EP2015/065061; 5 pgs.
E. Kumber, M. M. Mench in: J. Garche, C. Dyer, P. Moseley, Z. Ogumi, D. Rand, B. Scrosati, ed., Encyclopedia of Electrochemical Power Sources, vol. 2, Amsterdam, Elsevier, 2009, pp. 828-847.
Park et al., International Journal of Hydrogen Energy, vol. 37, 2012, pp. 5850-5865.
Wang et al., Journal of Power Sources, vol. 162, 2006, pp. 474-479.
Canadian Office Action dated Nov. 14, 2018, in connection with corresponding CA Application No. 2,954,704 (4 pgs.).
Rüdiger Schweiss, et al., "Enhancement of proton exchange membrane fuel cell performance by doping microporous layers of gas diffusion layers with multiwall carbon nanotubes", in Journal of Power Sources, vol. 220, Dec. 15, 2012, pp. 79-83 (5 pgs.).
J. B. Xu, et al., "Mesoporous carbon with uniquely combined electrochemical and mass transport characteristics for polymer electrolyte membrane fuel cells", in RSC Advances, vol. 3, 2013, pp. 16-24 (9 pgs.).

* cited by examiner

MEMBRANE ELECTRODE ASSEMBLY

The invention relates to a membrane electrode assembly for polymer electrolyte (PEM) fuel cells which has a low sensitivity to variations in relative humidity and as a result renders possible an improved water management of the fuel cell.

PEM fuel cells are electrochemical energy converters which generate electrochemical energy directly from liquid or gaseous fuels. Due to the high energy density of the fuels and the high current densities which can be achieved, fuel cells are promising candidates for uses in the electromobility field.

The core piece of a PEM fuel cell is the so-called membrane electrode assembly (MEA), which consists of a proton exchange membrane which carries porous electrodes on both sides, which in their turn can be classified into a gas diffusion layer and a catalytically active layer (reaction layer).

In a PEM fuel cell the MEA is positioned between 2 current collector plates, which supply respectively the cathode and the anode side with fuels, and conduct away the currents during operation.

Catalysts which are conventionally employed are platinum and platinum metals, such as palladium, ruthenium, rhodium, iridium and alloys of these as well as alloys of platinum metals with transition metals. The noble metal loading of the anodic reaction layer in which the oxidation of hydrogen proceeds is as a rule 0.02 to 0.2 mg/cm$^2$. Due to the inhibited kinetics of the reduction of oxygen correspondingly higher amounts of noble metal of from 0.1 to 0.5 mg/cm$^2$ are required on the cathode for an acceptable power density.

Membrane electrode assemblies are produced either by pressing a membrane coated with catalyst on both sides (CCM, catalyst-coated membrane) with two layers of gas diffusion layers or by laminating or hot pressing a polymer electrolyte membrane with two gas diffusion electrodes (gas diffusion layers which comprise catalytically active materials).

The membrane electrode assembly determines the performance of a fuel cell and is decisive for the power-specific costs of the entire fuel cell system.

Due to the high costs of noble metal catalysts the highest possible power density (electrical output per unit electrode surface area) with minimal catalyst loading is required. This requirement can be realised only by an optimised pore or particle design of the reaction layer (high catalyst utilisation) and of the gas diffusion layers.

In addition, the gas diffusion layers must have a high diffusion rate of the fuels and at the same time a low electrical resistance, a high thermal conductivity and an adequate mechanical stability.

A core problem of the low temperature PEM fuel cell (up to 90° C.) exists in complex water management. On the one hand, a complete as possible moistening of the proton exchange membrane is important in order to maintain its ionic conductivity and mechanical integrity. Moistened fuel gases are therefore conventionally employed for fuel cells for use in electrotraction in order to maximise the cell output.

On the other hand, water is formed by the cell reaction, which must be removed from the cell via the cathodic gas diffusion layer in order not to block the gas diffusion layers and the cathodic reaction layer. At high current densities and humidities above all, flooding of the cation (inadequate diffusion of oxygen within the reaction layer due to partial blockade of the pore system with liquid water) and condensation of water in the GDL are a problem, since flooding of the cathode not only limits the output but also has adverse effects on the operational lifespan.

Further transport processes furthermore exist in a PEM fuel cell, such as back-diffusion of water (from the cathode to the anode) and the electroosmotic transport of water (migration of water from the anode to the cathode as a result of the proton transport), which likewise can be influenced by the properties of the gas diffusion layers.

Marked variations in the water content over the electrode surface can occur precisely in fuel cell systems for use in automobiles, depending on the operating state, so that the most diverse requirements are imposed on the gas diffusion media.

In most cases a gas diffusion layer consists of a two-layered composite based on a macroporous carbon fibre substrate (wet or dry laid nonwovens or woven fabric) equipped with a microporous layer (MPL). The MPL in its turn consists of carbon particles (acetylene black or graphite and/or porous carbons) and fluoropolymers, such as polytetrafluoroethylene (PTFE), which at the same time functions as a binder substance and hydrophobising additive.

The MPL acts as a hydrophobic barrier which assists the moistening of the membrane, reduces the contact resistance of the GDL to the reaction layer and above all at high humidities and high current densities (at which a large amount of water is formed by the cell reaction) reduces the saturation of the cathodic catalyst layer with water (Park et al., International Journal of Hydrogen Energy, volume 37, 2012, pp. 5850-5865).

Starting from MPL-coated GDLs, gas diffusion layers can furthermore be conveniently produced by printing or spraying the MPL side with catalyst inks or vapour-depositing or sputtering on catalytically active noble metals.

Significant improvements in the power densities under moist operating conditions have been found, for example, by using MPLs which are doped with carbon nanotubes (CNTs) (DE 102011083118 A1). This is to be attributed both to an improved electrical conductivity and to an increased gas diffusivity.

GDLs can be adapted for dry or moist operating conditions respectively by mixtures of various types of carbon black. A high BET surface area of the MPL carbon blacks brings e.g. advantages under dry operating conditions (Wang et al., Journal of Power Sources, volume 162, 2006, pp. 474-479).

As a rule a membrane electrode assembly (MEA) is constructed from symmetric GDLs (same GDL type at the anode and cathode). The different requirement profiles at the anode and cathode are not taken into account here. Instead, membrane electrode assemblies are usually produced with two identical GDLs and the GDL is selected according to the prevailing operating conditions of the fuel cell.

Due to the relatively good electrochemical kinetics and the high diffusion speed of hydrogen, the main task of the anodic GDL lies in assisting the moistening of the membrane and preventing the loss of moisture via the anode, which may occur above all under dry conditions and low current densities (E. Kumber, M. M. Mench in: J. Garche, C. Dyer, P. Moseley, Z. Ogumi, D. Rand, B. Scrosati, ed., Encyclopedia of Electrochemical Power Sources, volume 2, Amsterdam, Elsevier, 2009, pp. 828-847).

At moderate (>30%) to high moistening (>70%) and simultaneously high current densities (from 2 A/cm$^2$), at which a large amount of water forms at the cathode by the cell reaction, this can condense in the cathodic reaction layer or in the gas diffusion layer and as a result further impede the in any case already output-determining step of reduction of oxygen. A cathodic GDL must therefore ensure a high gas diffusion and at the same time by its pore structure and its hydrophobic properties assist an effective transport away of the excess liquid water. The MPL of the cathodic GDL generally ensure a homogeneous distribution of water in the membrane electrode assembly.

EP2343762 A1 describes, for example, a membrane electrode assembly in which the cathodic diffusion layer has a higher porosity than the anodic diffusion layer. The single-layer diffusion layers were produced in this context from carbon black, graphite and fluoropolymer via a dry method without a carbon fibre carrier structure.

A similar set-up is chosen in EP 1 721 355 B1, in which anodic and cathodic GDLs of the membrane electrode assembly differ with respect to the pore volume. This is achieved by different contents of fluoropolymer in the MPL.

WO 02/35620 A2 describes a multilayered construction of a gas diffusion electrode and a membrane electrode assembly, which by this layered structure acquires an increased tolerance towards variations in humidity.

There is therefore the object of developing a membrane electrode assembly which achieves an improved cell output for a wide range of operating conditions (humidities).

This object is achieved by a membrane electrode assembly according to claim 1 having different gas diffusion layers on the anode and cathode. The GDLs differ here with respect to carrier substrate and microporous coating.

A GDL having e.g. an MPL of graphite and carbon nanotubes effectively prevents the membrane from drying out on the anode, while e.g. on the cathode a GDL having a higher gas permeability or diffusivity renders possible an improved water management at high current densities. By this asymmetric configuration a high cell output can be maintained under a fluctuating humidity (25% to 100%), which is typical of automobile PEM systems.

Figure 2:
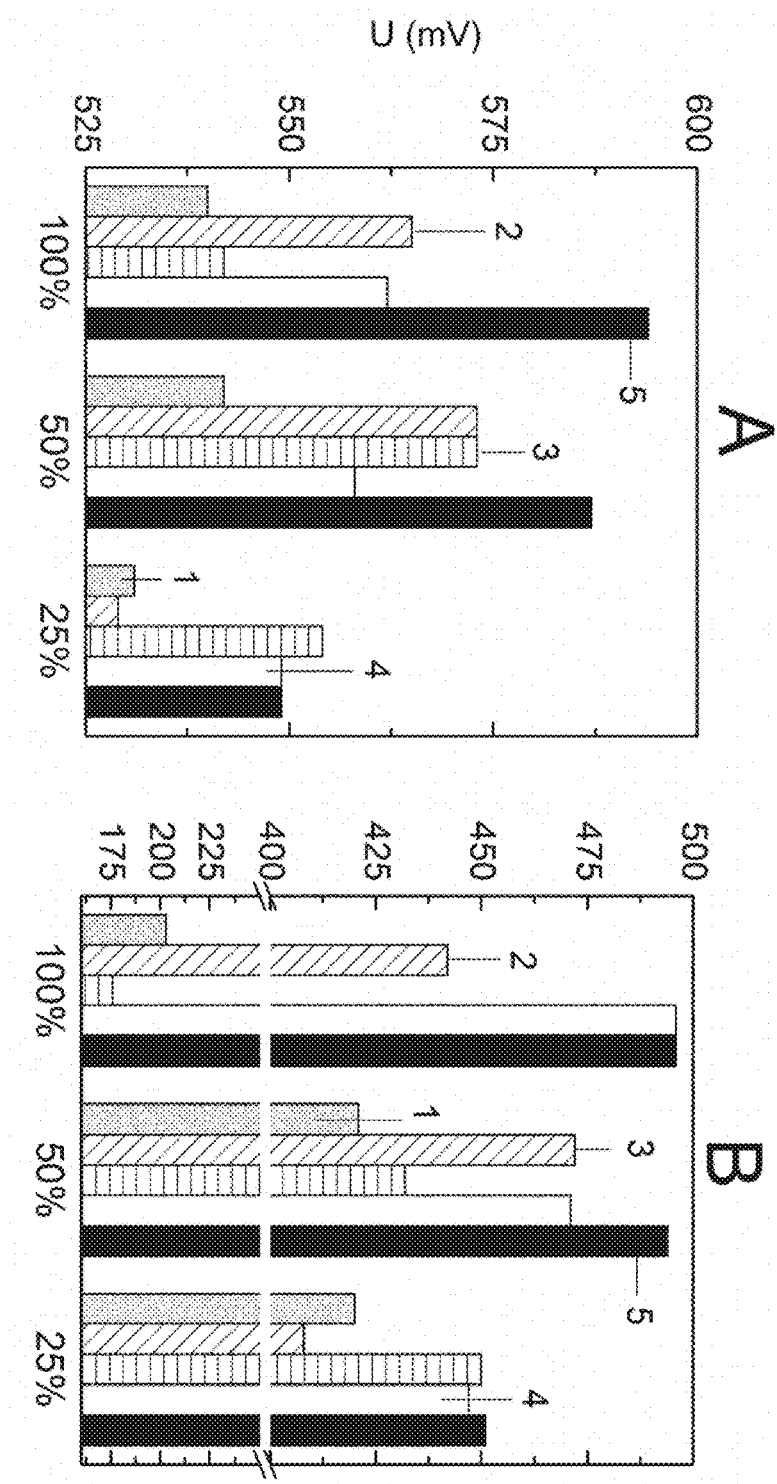

FIG. 1 shows a diagram of an exemplary embodiment of a membrane electrode assembly. FIG. 2 shows exemplary cell voltage measurements using various membrane electrode assemblies at a constant cell temperature for relative humidities at different densities.

FIG. 1 is a diagram of the membrane electrode assembly according to the invention. The membrane electrode assembly according to the invention for PEM fuel cells consists of a proton exchange membrane (25), an anodic catalyst layer (20), a cathodic catalyst layer (30) and two different gas diffusion layers on the anode and cathode sides. The two MPLs are doped with carbon nanotubes, which reduce the electrical resistance of the MPL and at the same time achieve a high gas diffusion and also highly hydrophobic properties.

The anodic GDL is based on a carbon fibre structure (10) and is provided with a microporous layer (15) consisting of graphite, carbon nanotubes (50) or carbon nanofibres, and PTFE. The cathodic GDL consists of a carbon fibre structure (40) and a microporous layer (35) based on carbon black, carbon nanotubes and/or carbon nanofibres and PTFE.

The carbon black is preferably an acetylene black or a graphitised oil black. The microporous layer of the cathodic GDL particularly preferably additionally comprises mesoporous carbon or activated carbon.

The carbon fibre substrates are produced by the wet nonwoven technique or by dry depositing of precursor staple fibres (bonding by means of fluid jets) and after an impregnation (with carbonisable resins, binder polymers and/or graphite and/or carbon precursors, such as pitch, coke, bitumen) are subjected to a final carbonising under an inert gas atmosphere.

Preferably, the graphite content of the microporous layer of the anodic GDL (15) is 50 to 90%.

The content of carbon nanotubes (50) in the microporous layer of the anode and cathode GDL is preferably 8 to 25%.

The content of fluoropolymer in the microporous layer of the anode MPL is preferably 15 to 30% and the fluoropolymer content of the cathode MPL is preferably 10 to 25%.

The fluoropolymer used is preferably polytetrafluoroethylene (PTFE), tetrafluoroethylene/hexafluoropropylene copolymer (FEP), polyvinylidene fluoride (PVDF), ethylene/tetrafluoroethylene (ETFE) or perfluoroalkoxy polymers (PFA).

Preferably, the porosity of the anodic carbon fibre structure (10) is 84% or less and the density thereof is at least 0.25 g/cm$^3$.

Preferably, the porosity of the carbon fibre structure of the cathodic GDL (40) is 85% or more and the density thereof is a maximum of 0.2 g/cm$^3$.

Preferably, the content of activated carbon, carbon black or mesoporous carbon of the cathodic MPL (35) is 50 to 90 percent by weight.

Preferably, the MPL of the cathodic GDL (35) additionally consists of mesoporous carbon or activated carbon.

The carbon fibre carrier structures on which the anodic GDL and the cathodic GDL are based preferably differ with respect to the average pore diameter.

The microporous layers of the anodic GDL and the cathodic GDL preferably comprise two types of carbon materials which differ with respect to the average pore diameter. The average particle diameters of the carbon particles are preferably in the range here of from 20 nm to 20 µm.

As the polymer electrolyte membrane (or also called proton exchange membrane), preferably perfluorosulphonic acid membranes (PFSA, trade names e.g. Nafion™ Aquivion™, Fumapem™), PFSA-PTFE composites (Gore-Select™), perfluorosulphonic acid-PTFE composites, sulphonated polysulphones, sulphonated hydrocarbon membranes, sulphonated polyether ether-ketones (s-PEEK), sulphonated polyimides, sulphonated polyether imides, sulphonated poly(2,6-dimethyl-1,4-phenylene ether), composite membranes (PFSA-silica) or sulphonated polystyrenes are used.

Noble metal catalysts which are used are, preferably, platinum black, platinum metal alloys (Pt, Pd, Rh, Ir, Ru), alloys of platinum metals with transition metals (Ni, Co, Cu, Mo, Sn) as nanoparticles or as nanoparticles on carrier structures (carbon or oxidic carrier particles) or sputtered or electrochemically deposited catalyst layers/films based on platinum metals.

The invention furthermore relates to a fuel cell which comprises a membrane electrode assembly and a pair of separators (60) which are arranged such that the membrane electrode assembly is arranged between them.

According to the present invention the method specified in DIN ISO 9277:2003-05 is employed for measuring the BET surface area of the carbon materials.

EMBODIMENT AND REFERENCE EXAMPLES

To produce various GDLs 2 types of standard carbon fibre papers, Sigracet® GDL 24 BA (porosity=83%, carbon fibre substrate 51) and Sigracet® 25 BA (porosity=88%, carbon fibre substrate S2) were used. The substrates were each hydrophobised with 5 percent by weight of polytetrafluoroethylene (PTFE). Microporous layers were produced on the abovementioned carrier papers by knife coating by means of paste-like carbon-PTFE dispersions.

For this, various, optionally preground carbons were dispersed in water with 2 percent by weight of polyvinyl alcohol under the action of shearing forces. In each case 1.25 percent by weight of hydroxyethylcellulose was added as an additive and the required amount of polytetrafluoroethylene (PTFE) in the form of an aqueous dispersion (Dyneon TF5035) and 1 percent by weight of polyethylene glycol were then added. In the case of the coating dispersion for the cathodic MPL 1 to 3 percent by weight of pore-forming agent (ammonium carbonate, oxalic acid, hexamethylenetetramine) are optionally also added.

After homogenising for several hours the viscous dispersions were pumped via a particle filter (<30 μm) on to a knife coating unit and coated on to a web of the carrier substrate.

The amount of the MPL applied to the carrier substrate was in each case 3 to 3.7 mg/cm². After the coating the materials, which had been dried in a flow-through oven, were sintered at 350° C. for 15 minutes. Acetylene black (BET=65 m²/g), synthetic graphite (BET=30 m²/g) and multiwalled carbon nanotubes (BET=260 m²/g) were used as the carbon components of the dispersions.

Overview of the composition of the various GDL/MPL recipes

| Carbon fibre carrier substrates, hydrophobised | |
|---|---|
| M1 | GDL 24 BA, thickness 190 μm, density 0.25 g/cm³, PTFE 5 ± 1 wt. % |
| M2 | GDL 25 BA, thickness 190 μm, density 0.20 g/cm³, PTFE 5 ± 1 wt. % |
| Microporous layers (MPL) | |
| M1 | 77 wt. % of acetylene black, 23 wt. % of PTFE |
| M2 | 62.5 wt. % of acetylene black, 22.5 wt. % of MWCNT, 15 wt. % of PTFE |
| M3 | 61.5 wt. % of synthetic graphite, 20.5 wt. % of MWCNT, 18 wt. % of PTFE |

Membrane electrode assemblies were produced by means of various GDLs (substrate/MPL combinations S/M) and a catalyst-coated perfluorosulphonic acid-(e-PTFE) composite membrane (dry thickness 18 μm, noble metal loadings of 0.1 mg/cm² of platinum on the anode and 0.4 mg/cm² of platinum on the cathode).

| Membrane electrode assembly | Anode GDL/MPL | Cathode GDL/MPL |
|---|---|---|
| MEA 1 (reference example) | S1/M1 | S1/M1 |
| MEA 2 (reference example) | S2/M1 | S2/M1 |
| MEA 3 (reference example) | S1/M3 | S1/M3 |
| MEA 4 (reference example) | S2/M2 | S2/M2 |
| MEA 5 (MEA according to the invention) | S1/M3 | S2/M2 |

Fuel cell tests on the various membrane electrode assemblies (MEA 1 to MEA 5) were carried out by means of an individual cell (active area 25 cm²) with current collectors of graphite with milled-in flow channels.

FIG. 2 shows the cell voltages measured (in millivolt) using various membrane electrode assemblies at a cell temperature of 80° C. for relative humidities of the gases of 25%, 50% and 100% at current densities of in each case 1.5 A/cm² (FIG. 2, A) and 2 A/cm² (FIG. 2, B). The supply pressure was 150 KPa and the stoichiometry for the anode was 1.5 and for the cathode 2.0 respectively. The contact pressure of the MEA on the graphite plates was 1 MPa.

The membrane electrode assembly (5) according to the invention renders possible at least comparable or significantly higher cell voltages than the symmetric membrane electrode assemblies (MEA 1 to 4) under all operating conditions.

LEGEND TO FIG. 1

(10) Carbon fibre structure of the anodic GDL
(15) MPL of the anodic GDL
(20) Anodic catalyst layer
(25) Proton exchange membrane
(30) Cathodic catalyst layer
(35) MPL of the cathodic GDL
(40) Carbon fibre structure of the cathodic GDL
(50) Carbon nanotubes
(60) Separators

The invention claimed is:

1. Membrane electrode assembly for polymer electrolyte membrane (PEM) fuel cells, comprising:
a proton exchange membrane, two catalyst layers including an anode catalyst layer and a cathode catalyst layer, and two gas diffusion layers (GDL), wherein an anodic GDL is based on a carbon fibre structure and has a microporous layer (MPL), comprising graphite, carbon nanotubes or carbon nanofibres, and polytetrafluoroethylene (PTFE), and in which a cathodic GDL is based on a carbon fibre structure and has a microporous layer based on carbon black, carbon nanotubes and/or carbon nanofibres, and PTFE,
wherein the porosity of the anodic carbon fibre structure is 84% and/or less, and the density thereof is at least 0.25 g/cm3, and
wherein the porosity of the carbon fibre structure of the cathodic GDL is 85% or more and the density thereof is at most 0.2 g/cm3.

2. Membrane electrode assembly according to claim 1, wherein the graphite content of the microporous layer of the anodic GDL is 50 to 90%.

3. Membrane electrode assembly according to claim 1, wherein the content of carbon nanotubes in the microporous layer of the anode and cathode GDL is 8 to 25%.

4. Membrane electrode assembly according to claim 1, wherein the content of PTFE of the microporous layer of the anode MPL is 15 to 30 percent by weight and the PTFE content of the cathode MPL is 10 to 25 percent by weight.

5. Membrane electrode assembly according to claim 1, wherein the cathodic GDL additionally comprises mesoporous carbon or activated carbon, and the content of activated carbon, carbon black or mesoporous carbon of the cathodic GDL is 50 to 90 percent by weight.

6. Fuel cell which comprises a membrane electrode assembly according to claim 1 and a pair of separators which are arranged such that the membrane electrode assembly is arranged between them.

* * * * *